United States Patent

Kisuno et al.

[11] Patent Number: 6,153,657
[45] Date of Patent: Nov. 28, 2000

[54] PROCESS FOR PRODUCING A SOLVENT-LESS O/W TYPE EMULSION

[75] Inventors: Atsushi Kisuno; Tatsuo Ansai, both of Tsukuba; Shihoko Aizawa, Ibaraki, all of Japan

[73] Assignee: Hodogaya Chemical Co., Ltd., Kanagawa, Japan

[21] Appl. No.: 09/088,383

[22] Filed: Jun. 1, 1998

[30] Foreign Application Priority Data

Jun. 2, 1997 [JP] Japan ..................................... 9-143684
Jun. 6, 1997 [JP] Japan ..................................... 9-149645

[51] Int. Cl.$^7$ ............................. C09K 3/00; B01F 3/08; B01F 17/00; A01N 61/00
[52] U.S. Cl. .............................. 516/925; 516/30; 516/76; 516/25; 516/28; 516/75; 516/27; 514/941
[58] Field of Search ................................ 516/925, 30, 76, 516/25, 28, 75, 27; 514/941

[56] References Cited

U.S. PATENT DOCUMENTS

| 3,909,805 | 9/1975 | Toruon et al. | 365/105 |
| 4,230,809 | 10/1980 | Heinrich et al. | 521/65 |
| 4,286,020 | 8/1981 | Himel et al. | 428/407 |
| 4,309,213 | 1/1982 | Graber et al. | 504/330 |
| 4,938,797 | 7/1990 | Hasslin et al. | 504/116 |
| 5,074,905 | 12/1991 | Frisch | 504/48 |
| 5,421,876 | 6/1995 | Janoski | 106/278 |
| 5,759,558 | 7/1998 | Epstein et al. | 424/401 |

FOREIGN PATENT DOCUMENTS

| 0 482 417 | 4/1992 | European Pat. Off. . |
| 46-20519 | 6/1971 | Japan . |
| 48-4643 | 1/1973 | Japan . |
| 50-99969 | 8/1973 | Japan . |
| 54-91591 | 7/1979 | Japan . |
| 54-13671 | 10/1979 | Japan . |
| 55-92136 | 7/1980 | Japan . |
| 57-58601 | 4/1982 | Japan . |
| 58-2440 | 1/1983 | Japan . |
| 59-159177 | 9/1984 | Japan . |
| 59-162943 | 9/1984 | Japan . |
| 59-172653 | 9/1984 | Japan . |
| 59-230635 | 12/1984 | Japan . |
| 61-63601 | 4/1986 | Japan . |
| 61-97202 | 5/1986 | Japan . |
| 62-45501 | 1/1987 | Japan . |
| 62-67003 | 3/1987 | Japan . |
| 62-126101 | 6/1987 | Japan . |
| 63-107901 | 5/1988 | Japan . |
| 2-29642 | 1/1990 | Japan . |
| 2-111703 | 4/1990 | Japan . |
| 2593886 | 12/1996 | Japan . |
| 9-52810 | 2/1997 | Japan . |

*Primary Examiner*—Lyle A. Alexander
*Assistant Examiner*—Monique T. Cole
*Attorney, Agent, or Firm*—Pillsbury Madison & Sutro LLP

[57] ABSTRACT

An organic solvent-less O/W type emulsion having an excellent stability for storage and water-dilution is produced by a specific process in which (1) a mixture of (a) water with (b) an oily substance selected from oily effective materials and oily liquid materials, the oily substance and water being capable of forming an interface therebetween, (c) a high molecular weight surfactant and (d) a low molecular weight surfactant is stirred at a temperature of 40° C. or less, to provide an O/W type emulsion; (2) the emulsion is heated to gel the emulsion; (3) the gel is heated to phase invert from O/W to W/O; (4) the W/O emulsion is cooled to a temperature below the gelling temperature; and (5) the resultant O/W emulsion is further stirred, and optionally in or after the cooling step (4), a particulate solid substance or an aqueous suspension thereof is mixed with the emulsion.

26 Claims, No Drawings

PROCESS FOR PRODUCING A SOLVENT-LESS O/W TYPE EMULSION

BACKGROUND OF THE INVENTION

1. Field of the Invention

The present invention relates to a solvent-less O/W type emulsion. More particularly, the present invention relates to a solvent-less O/W type emulsion which exhibits a high stability in storage and employment and optionally includes a particulate solid material stably and uniformly dispersed in the emulsion.

2. Description of the Related Art

It is known that some medicaments and agricultural chemicals must exhibit a high sustained-releasing property and/or a diffusing property, as a function thereof.

For example, with respect to the production of sustained release capsules, Japanese Unexamined Patent Publications No. 59-230,635 and No. 59-159,177 disclose coacervation methods, and Japanese Unexamined Patent Publications No. 59-172,653, and 59-162,943 disclose drying-in-liquid methods, phase separation methods and spray-drying methods. Also, an agricultural chemical-producing method using a microcapsule-forming technology for the purpose of extending a effect-retaining time by a sustained release effect or of stabilizing the agricultural effective component is known. For example, various processes for producing microcapsules containing an agricultural chemical, by using, as a water-soluble capsule-forming material, gelatin (for example, Japanese Unexamined Patent Publication No. 50-99,963), polyamide, polyurethane, polyurea or polyester resin (Japanese Unexamined Patent Publication No. 54-135,671), polyvinyl acetate or polyvinyl ether resin (Japanese Unexamined Patent Publication No. 55-92,136), polyurethane-polyurea resin (Japanese Unexamined Patent Publication No. 54-91,591), polyamide-polyurea resin (Japanese Unexamined Patent Publication No. 48-4,643), or resinous prepolymer-water-soluble cationic urea resin (Japanese Unexamined Patent Publication No. 2-29,642), are known. Also, Japanese Unexamined Patent Publication No. 7-64,682 discloses a process for producing an aqueous suspension of microcapsules. These prior art processes are, however, disadvantageous in that the formation of the microcapsules is complicated, and the resultant products are unstable in performance thereof due to dispersion in thickness and/or in failure rate of the micro-capsules.

On other hand, with respect to the diffusion performance, various suspension-producing processes are known. For example, Japanese Examined Patent Publication No. 46-20,519 discloses a process for producing an aqueous suspension by wet-pulverizing a hydrophobic solid agricultural chemical in water or a hydrophilic medium, and suspending the resultant hydrophilicized extremely fine solid particles in a suspension medium. Japanese Examined Patent Publication No. 58-2,440 discloses a agricultural chemical suspension comprising a water-scant soluble solid agricultural chemical or a mixture of a water-scant soluble solid agricultural chemical with a water-soluble solid agricultural chemical, a surfactant, a water-soluble high molecular weight compound and water, and having a preparation viscosity of 200 to 500 cP at a temperature of 20° C. Japanese Unexamined Patent Publication No. 57-58,601 discloses an agricultural chemical suspension comprising a agricultural chemical material insoluble or scant soluble in water or an organic solvent, a surfactant, xanthane gum and water. Japanese Unexamined Patent Publication No. 2-111,703 discloses an agricultural chemical suspension comprising an agricultural chemical material insoluble or scant soluble in water, a surfactant, a water-soluble biopolymer and water. Also, Japanese Examined Patent Publications No. 7-47,521, No. 7-47,522, No. 64-7,041, No. 63-58,802 and No. 6-78,202 disclose aqueous agricultural chemical suspensions containing a herbicide-active material or a biocide-active chemical and a surfactant.

Japanese Unexamined Patent Publication No. 9-52,810 discloses an aqueous emulsion having a reduced danger of ignition in production, transportation and storage. In this emulsion, as an emulsifying agent, polyoxyethylene-polyoxypropylene block copolymer is preferably used. Also, Japanese Unexamined Patent Publication No. 6-92,801 and Japanese Patent No. 2593,886 disclose a processes for producing a suspoemulsion containing two or more effective components greatly different in physico-chemical properties from each other, and report that the preparation of the suspoemulsion from the above-mentioned two or more components has been generally considered difficult.

An agricultural chemical in the form of microcapsules as sustained release capsules for the purpose of extending the effect-retaining time is disadvantageous in that the preparation procedures are difficult and a difference in capsule thickness or in failure rate occurs between production lots. Therefore, it is very difficult to maintain the sustained release property of the microcapsulated chemical constant. Further, when the microcapsulating technology is applied to suspended chemicals, the capsule shalls may be broken during the capsule-forming process, and the capsule-forming cost is high.

On other hand, the suspended agricultural chemical having a high diffusing property must be produced from a water-scant soluble solid chemical in the presence of a surfactant (emulsifier) and water by grind-pulverizing the solid chemical. This production requires a long time and much labor. Also, in this process, the emulsifier needs an organic solvent which may cause the environment to be poluted, and the effective component may crystallize during storage. Even in an agricultural chemical in improved microcapsules, the organic solvent is contained as an indispensable component. In a suspoemulsion chemical comprising a mixture of a emulsion system and a suspension system, to prevent a phase separation and a hard caking, it is indispensable to finely pulverizing the suspended solid particles and to add a thixotropic agent thereto. When the agricultural chemical having a high diffusing property and produced by the above-mentioned process is scattered in a rice paddy, the effective component in the chemical rapidly diffuses and an extension of the effect-retaining time cannot be expected.

An object of the present invention is to provide a process for producing a solvent-less O/W type emulsion having a high storage stability and capable of being diluted with a large amount of water with a high stability with a low cost.

The solvent-less O/W type emulsion of the present invention can contain two or more effective components which are greatly different in physical and properties from each other without need of assistance of an organic solvent.

Also, the solvent-less O/W type emulsion of the present invention may have a sustained release property. Further, the solvent-less O/W type emulsion of the present invention can contain a suspension of a solid particles with a high stability.

The solvent-less O/W type emulsion of the present invention is utilizable for wide various uses of the agricultural, pharmaceutical and cosmetic fields.

SUMMARY OF THE INVENTION

The above-mentioned object can be attained by the process of the present invention for preparing a solvent-less O/W type emulsion, which comprises the steps of:

(1) mixing (a) water with (b) an oily substance comprising at least one member selected from the group consisting of oily effective materials and oily liquid materials, the oily substance and water being capable of forming an interface therebetween, (c) a high molecular weight surfactant and (d) a low molecular weight surfactant, at a temperature of 40° C. or less, while stirring the mixture to provide an O/W type emulsion;

(2) increasing the temperature of the resultant O/W type emulsion, which stirring the emulsion, until the O/W type emulsion is uniformly gelled;

(3) further increasing the temperature of the O/W type emulsion gel until the O/W type emulsion gel is phase-inverted to a W/O type emulsion gel;

(4) cooling the W/O type emulsion gel to a temperature below the gelling temperature in the step (2), to convert the W/O type emulsion gel to an O/W type emulsion; and (5) stirring the resultant product at a temperature of 40° C. or less, to prepare a O/W type emulsion containing no solvent and stable to dilution with water.

The process of the present invention optionally further comprises, after the cooling step (4), the step of (4a) mixing a water-scant soluble particulate solid substance comprising at least one member selected from the group consisting of solid effective materials and solid auxiliary additives, into the O/W type emulsion prepared in the step (4), in which the resultant mixture of the step (4a) is subjected to the stirring procedure of the step (5).

The process of the present invention optionally further comprises, after the cooling step (4), the steps of:

(4b) mixing a water-scant soluble particulate solid effective material and an additional high molecular weight surfactant into the cooled O/W type emulsion, while stirring the mixture at a temperature of 40° C. or less; and (4c) further mixing an additional low molecular weight surfactant having a molecular weight of 1100 or less and of at least 400 below
the molecular weight of each of the high molecular weight surfactant and the additional high molecular weight surfactant, into the mixture of the step (4h), to provide a mixture of a suspension of the solid effective material with the O/W type emulsion,
in which the resultant mixture of the step (4c) is subjected to the stirring procedure of the step (5), The above-mentioned process of the present invention optionally further comprises, between the cooling step (4) and the mixing step (4b), the step of:

(4d) adding an additional particulate solid effective material which is scant soluble in water and soluble in the oily substance, into the O/W type emulsion produced in the step (4), which stirring the mixture at a temperature of 40° C. or less, to allow the additional particulate solid effective material to be dissolved in the oily substance in the O/W type emulsion,
in which the resultant O/W type emulsion obtained in the step (4d) is subjected to the mixing procedure of the step (4b).

The process of the present invention optionally further comprises the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less of at least 400 below that of the high molecular weight surfactant and the additional high molecular weight surfactant; and (7) mixing the resultant solid effective material suspension into the O/W type emulsion prepared in the step (4), in which the resultant mixture of the step (7) is subjected to the stirring procedure of the step (5).

The process of the present invention optionally further comprising the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less and of at least 400 below that of the high molecular weight surfactant and the additional high molecular weight surfactant; (4b) after the cooling step (4), adding an additional particulate solid effective material which is scant soluble in water and soluble in the oily substance, into the O/W type emulsion produced in the step (4), which stirring the mixture at a temperature of 40° C. or less, to allow the additional particulate solid effective material to be dissolved in the oily substance in the O/W type emulsion; and (7a) mixing the solid effective material suspension of the step (6) into the O/W type emulsion of the step (4b),
in which the resultant mixture of the step (7a) is subjected to the stirring procedure of the step (5).

DESCRIPTION OF THE PREFERRED EMBODIMENTS

In the process of the present invention for producing a solvent-less O/W type emulsion which is stable even when diluted with water, an oily substance is used as an indispensable component of the emulsion. In the process of the present invention, it should be noted that the oily substance forms cores of the emulsion particle droplets but does not serve as a solvent as used for conventional emulsion-preparation processes. Therefore, the oily liquid materials for the oily substance are not used as usual organic solvents and thus do not cause environmental pollution.

In the process of the present invention for producing the solvent-less O/W type emulsion having a high stability to dilution with water, a phase inversion of the emulsion is carried out twice to obtain very fine microemulsion particles. The resultant microemulsion particles are formed into composite particles with the low molecular weight surfactant and the high molecular weight surfactant. The composite particles have a very high stability even when diluted with a large amount of water.

This type of composite microemulsion particle of the present invention cannot be made by the conventional emulsifying process using the high and low molecular weight surfactants. Also, in the process of the present invention, the composite microemulsion particles prepared through the step (3) in which the O/W type emulsion is phase-inverted to a W/O type emulsion and the step (4) in which the W/O type emulsion is phase-inverted to an O/W type emulsion are stable even when mixed with an aqueous suspension of solid particles, because the solid particles are stably incorporated into the composite particles.

The solvent-less O/W type emulsion produced by the process of the present invention exhibits a high storage stability because the composite particles are very stable.

In the conventional aqueous emulsion, when diluted with water, the concentration of a surfactant in the emulsion decreases and thus the emulsion is rapidly destroyed. However, the stability of the O/W type emulsion of the present invention is not decreased by the dilution with water and thus the water-diluted emulsion can stably exist for a long time. Accordingly, the emulsion can maintain high diffusing property and exhibit a satisfactory sustained release property. In this case, the cost of the emulsion preparation is not so high in comparison with the microcapsule-reparation. Also, the sustained release property of the O/W type emulsion is high in comparison with that of the conventional emulsion.

In the process of the present invention for producing the solvent-less O/W type emulsion, two or more effective components, even when they greatly differ in physico-chemical properties from each other, can be co-used, without using an organic solvent.

The above-mentioned properties of the O/W type emulsion of the present invention can be utilized in various fields, for example, cosmetic materials, dyes, pigments, food materials, medicaments, agricultural chemicals, sanitary chemicals, home-use chemicals, office-use chemicals, construction and building materials, and industrial chemicals.

The oily effective materials usable for the oil substance are not limited to a specific type of materials. Usually, the oily effective materials can be selected from the following groups.

Cosmetic materials including, for example, organic fatty acids, for example, oleic acid and olive oil, vaseline, and benzyl benzoate Food materials including, for example, edible vegetable oils and animal oils Medicaments including, for example, methyl salicylate, clofibrate, diphenhydramine and dimercapsol Sanitary chemicals including, for example, bath additive, mothproofing agents and animal repellent agents Home-use chemicals including, for example, aromatics, deodorants and deodorizers toiletary chemicals and paint vehicles Agricultural chemicals including, for example, ethyl-4-[4-(4-trifluoromethylphenoxy)phenoxy]-2-pentenoate, butyl-2-[4-(5-trifluoromethyl-2-pyridyloxy)phenoxy] propionate, N-benzyl-2-isopropylpivalamide, N,N-dialkyl-2-chloroacetamide, S-ethyl-N,N-diethyl carbamate, 4-octanoyloxy-3,5-dibromobenzonitrile, 2-chloro-2',6'-diethyl-N-(n-propoxyethyl)-acetanilide, 2-(2-chlorobenzylthio)-5-propyl-1,3,4-oxadiazole, 2-(1,2-dimethylpropylamino)-4-ethylamino-6-methylthio-1,3,5-triazine, hexachloroacetone, tris-[2-(2,4-dichlorophenoxy)ethyl]-phosphite, and 2-(2-chlorophenyl)methyl-4,4-dimethyl-3-isooxazolidinone In the process of the present invention, the particulate solid effective materials for the optional step (4a), (4b), (4d) or (6) are not limited to a specific type of solid materials. Usually, the solid effective materials are preferably selected from the following groups.

Cosmetic materials including, for example, titanium dioxide, talc and ultraviolet ray-absorbers Dyes including, for example, disperse dyes and oil-soluble dyes Pigments including,organic pigments, for example, carbon black, chrome yellow, ultramarine and red iron oxide and organic pigments, for example, azo pigments, phthalocyanine pigments and quinacridone pigments Food materials including, for example, wheat powder, starch and milk powder Medicaments including, for example, benzalkonium, aspirin and erythromycin Sanitary materials including, for example, bath additives, mothproofing agents and animal repellent agents Home-use chemicals including, for example, aromatics, deodorants and deodorizers Office-use chemicals including, for example, colored formers for pressure sensitive copying sheets and thermo-sensitive recording sheets, inks and ink erasers Construction and building materials including, for example, silica gypsum and cements Industrial chemicals including, for example, activated carbon, ceramics and p-hydroxybenzoic acid.

Agricultural chemicals including, for example, 2,4-dichlorophenoxyacetic acid (2,4-D), 2-methyl-4-chlorophenoxyacetic acid (MCP), ethyl 2-methyl-4-chlorophenoxyacetate (MCP), 2,4-dichlorophenyl-3-methoxy-4-nitrophenylether (chloromethoxynyl), methyl=5-(2,4-dichlorophenyl)-2-nitrobenzoate (biphenox), 2,4,6-trichlorophenyl-4-nitrophenylether (CNP), 2-chloro-N-(4-methoxy-6-methyl-1,3,5-triazine-2-il-aminocarbonyl)benzenesulfonamide, methyl=2-[3-(4-methoxy-6-methyl-1,3,5-triazine-2-yl) ureidosulfonyl]benzoate, methyl=2-[3-(4,6-dimethylpyrimidine-2-yl)ureidosulfonyl]benzoate, ethyl=2-[3-(4-chloro-6-methoxypyrimidine-2-yl) ureidosulfonyl]benzoate, 1-(4,6-dimethoxypyrimidine-2-yl)-3-(3-ethylsulfonyl-2-pyridylsulfonyl)urea, 3-(6-methoxy-4-methyl-1,3,5-triazine-2-yl)-1-[2-(2-chloroethoxy)phenylsulfonyl]urea, methyl=2-[3-(4-methoxy-6-methyl-1,3,5-triazine-2-yl)-3-methylureidosulfonyl]benzoate, methyl=3-[3-(4-methoxy-6-methyl-1,3,5-triazine-2-yl)ureidosulfonyl] thiophene-2-carboxylate, 1-(4,6-dimethoxypyrimidine-2-yl)-3-3-(3-trifluoromethyl-2-pyridinylsulfonyl)urea, 2-(4,6-dimethoxypyrimidine-2-yl-carbamoylsulfamoyl)-N,N-dimethylnicotinamide, 3-(4,6-dimethoxy-1,3,5-triazine-2-yl)-1-[2-(2-methoxyethoxy)phenylsulfonyl]urea, 2-[3-(4,6-bis (difluoromethoxy)-pyrimidine-2-yl)ureidosulfonyl] benzoic acid=methyl, methyl=2-[(4-ethoxy-6-methylamino-1,3,5-triazine-2-yl)carbamoylsulfamoyl] benzoate, methyl=2-[3-(4,6-dimethoxypyrimidine-2-yl)ureidosulfonylmethyl]benzoate (Bensulfronmethyl), ethyl=5-[3-(4,6-dimethoxypyrimidine-2-yl)-ureidosulfonyl]-1-methylpirazole-4-carboxylate (Pyrazosulfron), N-[2-chloroimidazole(1,2-a)pyridine-3-yl-sulfonyl]-N'-(4,6-dimethoxy-2-pyrimidyl)urea (Imazosulfron), 2,4-bis(ethylamino)-6-methylthio-1,3, 5-triazine (Simetrin), 2,4-bis(isopropylamino)-6-methylthio-1,3,5-triazine (Prometrin), 2-(1,2-dimethylpropylamino)-4-ethylamino-6-methylthio-1, 3,5 -triazine (Dimetametrin), 4-(2,4-dichlorobenzoyl)-1,3-dimethyl-1H-pyrazole-5-yl-p-toluenesulfonate (Pyrazolate), 4-(2,4-dichlorobenzoyl)-1,3-dimethyl-5-phenacyloxy-1H-pyrazole (Pyrazoxyphen), 4-(2,4-dichloro-3-methylbenzoyl)-1,3-dimethyl-5-(4-methylphenacyloxy)-1H-pyrazole (Benzophenap), 5-tert-butyl-3-(2,4-dichloro-5-isopropoxyphenyl)-1,3, 4-oxadiazole-2(3H)-one (Oxadiazon), 2-(2,4-dichloro-3-methylphenoxy)-propionanilide (Chlomeplop), 2-(2-naphthyloxy)propionanilide (Naploanilide), 3-isopropyl-1H-2,1,3-benzothiadiazine-4-(3H)one-2, 2-dioxide (Pentazon), 3-(3,4-dichlorophenyl)-1,1- dimethylurea (Diuron), 2',3',-dichloroethoxymethoxybenzanilide, and 3,5-xylyl=N-methylcarbamate The above-mentioned agricultural effective materials may be used alone or in a mixture of two or more thereof. In the mixture, there is no limitation to the mixing ratio of the component materials to each other.

The oily liquid materials usable for the process of the present invention are not limited to a specific type of the materials. Usually, the oily liquid materials can be selected from the following groups.

Vegetable oils including cotton seed oil, flax seed oil, corn oil, peanut oil, olive oil, castor oil, palm oil, almond oil, avocado oil and jojoba oil Animal oils including, for example, perhydrosqualene and whale oil Mineral oils including, for example, liquid paraffin, vaseline oil, spindle oil and machine oil Synthetic oils including, for example, oleic acid, chlorinated paraffin, methylnaphthalene, glycerol monolaurate, 1-phenyl-1-xylylethane, dioctyl phthalate, dioctyl adipate, dioctyl sebacate, tri-n-butyl phoshate, acetyltributyl citrate, cetyl myristate, isopropyl stearate, decyl palmintate, hexyl laurate and propylene glycol=di-caprylate Silicone oils including, for example, cyclomethylcones, polymethylsiloxanes and dimethylconols Fluorinated oils including, for example, perfluoroethers and fluorinated silicones The high molecular weight surfactants usable for the process of the present invention are not limited to a specific type of surfactants usually, the high molecular weight surfactants have a molecular weight of 1100 to 700,000 and preferably selected from the following groups.

(1) Poly-4-vinylpyridine cationic surfactants (2) Graft copolymerization products of cationic derivatives of linear polysaccharides with olefin monomers (3) Copolymers of cationic monomers with nonionic monomers, for example, copolymers of alkylvinyl pyridium compounds with alkyleneoxide-addition reacted alkylvinyl alcohols (4) Poly(2-hydroxy-3-methacryloyloxypropyltrimethylammonium chloride)

(5) Poly(dimethylaminoethyl methacrylate)

(6) Salts of acrylic acid polymers with alkali metals, amines and ammonia (7) Copolymers of maleic anhydride with acrylic acid and salts of the copolymers with alkali metals, amines and ammonia (8) Copolymers of itaconic acid with acrylic acid and salts of the copolymers with alkali metals, amines and ammonia (9) Alkali metal salts of sulfonated styrene with maleic anhydride

(10) Alkali metal salts of polyvinyl sulfonic acid

(11) Alkali metal salts of polystyrenesulfonic acid

(12) Polymethacryloyloxypropylsulfonic acid

(13) Alkali metal salts of polyepoxysuccinic acid

(14) Condensation reaction products of sodium naphthalenesulfonate with formaldehyde

(15) Melaminesulfonic acid-formaldehyde condensation reaction products

(16) Copolymers of alkylaminoalkyl (meth)acrylamides with alkylacrylamide (meth)acrylate or acrylonitrile

(17) Dextrin-fatty acid esters

(18) Carboxymethylcellulose

(19) Polyvinyl alcohol

(20) Polyoxyethylene-polyoxypropylene block copolymers

Abbreviation:
Polyoxyethylene: POE
Polyoxypropylene: POP

(21) Ethylenediamine-POE-POP block copolymers

(22) POE-POP-triblock copolymers

The above-mentioned high molecular weight surfactants may be employed alone or in a mixture of two or more thereof. When used in the mixture, the mixed surfactants must have the same ionic property or in a combination of at least one ionic surfactant with at least one nonionic surfactant.

Among the above-mentioned surfactants POE (having a polymerization degree of 2 to 400)—POP (having a polymerization degree of 2 to 200) block polymers are particularly preferred for the present invention.

In the process of the present invention, the low molecular weight surfactants must be selected in consideration of the ionic property of the high molecular weight surfactants mixed therewith. For example, when the high molecular weight surfactant contains an anionic surfactant, the low molecular weight surfactant must be an anionic surfactant, a nonionic surfactant, or a mixture of an anionic surfactant with a nonionic surfactant. Also, when the high molecular weight surfactant contains a cationic surfactant, the low molecular weight surfactant must be a cationic or nonionic surfactant or a mixture of a cationic surfactant with a nonionic surfactant. As long as the above-mentioned conditions are attained, the low molecular weight surfactant may contains two or more surfactants different from each other.

The anionic low molecular weight surfactant compounds usable for the process of the present invention are not limited to specific type of compounds. Preferably, the anionic low molecular weight surfactant compounds are selected from alkyl sulfuric acid salts, organic sulfonic acids and salts thereof, polyether sulfuric acid salts, sulfosuccinic acid salts, and organic phosphoric acid compounds and salts thereof.

The alkylsulfuric acid salts include sodium laurylsulfate, triethanolamine laurylsulfate, ammonium laurylsulfate and potassium laurylsulfate.

The organic sulfonic acids and salts thereof include lignin sulfonic acid and alkylarylsulfonic acids, for example, alkylbenzenesulfonic acids and alkylnaphthalenesulfonic acids, and salts of the above-mentioned sulfonic acids.

The polyethersulfuric acid salts include polyoxyethylene-alkylethersulfuric acid salts, and polyoxyethylenealkylarylethersulfuric acid salts.

The sulfosuccinic acid salts include lauryl disodium sulfosuccinate, lauryl disodium polyoxyethylenealkylsulfosuccinate and dioctyl sodium sulfosuccinate.

The organic phosphoric acid compounds and salts thereof include laurylphosphoric acid polyoxyethylenealkylarylether-phosphates, polyoxyethylenephenylether-phosphorates and polyoxyethylene styrenified phenolether sulfate.

The cationic low molecular weight surfactant compounds usable for the present invention are preferably selected from alkyltrimethylammomium halides, alkyldimethylbenzylammonium halides, stearylpentaethoxyammonium chloride, and chloro-o[2-hydroxy-3-(trimethylammmonio)propyl] hydroxyethyl cellulose.

The alkyltrimethylammonium chlorides include lauryltrimethylammonium chloride, cetyltrimethylammonium chloride, stearyltrimethylammonium chloride, lauryltrimethylammonium bromide, and stearyltrimethylammonium bromide.

The alkyldimethylbenzylammonium halides include lauryldimethylbenzylammonium chloride, stearyldimethylbenzylammonium chloride, and tri(polyoxyethylene)stearylammonium chloride.

The nonionic low molecular weight surfactant compounds usable for the present invention may be selected from alkylolamides, polyoxyethylenealkylphenylethers, polyoxyethylenealkylethers, polyethyleneglycol-fatty acid esters, sorbitan-fatty acid esters, sorbitol-fatty acid esters, polyoxyethylenepolyoxypropylenealkyl ethers (block copolymers), polyoxyethylenealkylarylethers, polyoxyethylenestyrylphenolethers, polyoxyethylenealkylesters, and polyoxyethylenestyrylphenolether polymers.

The alkylolamides include lauric acid-diethanolamide, lauric acid-myristic acid-diethanolamide, myristic acid-diethanol amide and polyoxyethylene-stearic acid amide.

The polyoxyethylenealkylphenylethers include polyoxyethyleneoctylphenylether, polyoxyethylenenonylphenylether, and polyoxyethylenedinonylphenylether.

The polyoxyethylenealkylethers include polyoxyethylenelaurylether, polyoxyethylenetridecylether, polyoxyethyleneoleylether, polyoxyethylenecetylether, and polyoxyethylenestearylether.

The polyethyleneglycol-fatty acid esters include polyethyleneglycol monooleate, polyethyleneglycol dioleate, polyethyleneglycol monostearate, ethyleneglycol distearate, and polyethyleneglycol distearate.

The sorbitan-fatty acid esters include decaglycerol monocaprylate, glycerol monostearate, sorbitan monocaprylate, sorbitan monolaurate, sorbitan monopalmitate, sorbitan monostearate, sorbitan distearate, sorbitan trioleate, sorbitan sesquioleate, polyoxyethylenesorbitan monolaurate, polyoxyethylenesorbitan monopalmitate, polyoxyethylenesorbitan monostearate, and polyoxyethylenesorbitan trioleate.

The sorbitol-fatty acid esters include polyoxyethylenesorbitol monooleate and polyoxyethylenesorbitol tetraoleate.

The polyoxyethylenepolyoxypropylenealkylethers include polyoxyethylenepolyoxypropylene alkyletherblocked polyoxyethylenepolyoxypropyleneglycol, and ethylenediaminetetrapolyoxyethylenepolyoxypropylene.

In the process of the present invention for producing the solvent-less O/W type emulsion, the process efficiency can be optionally enhanced by adding a solid auxiliary additive selected from, for example, viscosity modifiers, preservatives, mildewproofing agents, defoaming agents and excipients. The effect of the present invention can be attained without using the additive.

The viscosity modifiers include, for example xanthane gum, gua gum, gum tragacanth, gum arabic, casein, dextrin, carboxymethyl cellulose, carboxymethyl starch-sodium salt, sodium alginate, hydroxyethyl cellulose, carboxyethyl cellulose, methyl cellulose, hydroxypropyl cellulose, hydroxyethyl cellulose, polyvinyl alcohol, polyacrylic acid and derivatives thereof, colloidal magnesium silicate hydrate, and colloidal aluminum magnesium silicate. These compounds can be used alone or in a mixture of two or more thereof.

The preservatives and mildewproofing agents include, for example, p-chloro-m-xylenol, p-chloro-m-cresol, butyl p-hydroxybenzoate, sorbitan fatty acid, and potassium sorbate. They can be employed alone or in a mixture of two or more thereof.

The defoaming agents usable for the present invention can be selected from conventional silicone, fatty acid and mineral oil type defoaming agents.

The excipients usable for the present invention can be selected from conventional excipients, for example, Carplex™ and Aerosil™ (trademark).

Another auxiliary additives are antifreezing agents, for example, ethyleneglycol, diethyleneglycol, propyleneglycol, glycerol, ethyleneglycolmonomethylether, diethyleneglycol monomethyl ether, and methanol. They can be used alone or in a mixture of two or more thereof.

In the process of the present invention for producing a solvent-less O/W type emulsion, the preparation of the O/W type emulsion can be effected by usual aqueous emulsion-preparation procedures without using specific procedure or apparatus. The emulsion can obtain desired properties, for example, a target effect-retaining time, by using a suitable type of stirrer having stirring wings with an appropriate form and dimensions and controlling the stirring rate and time and the stirring temperature. The stirrer may be selected from, for example, homomixers, homogenizers and Dynomills.

In the process of the present invention, (1) (a) water is mixed with (b) the oily substance as mentioned above, and (c) the high molecular weight surfactant and (d) a low molecular weight surfactant, at a temperature of 40° C. or less by using, for example, a homomixer at a rotation of 3,000 to 15,000 rpm for 20 minutes; (2) the resultant O/W emulsion is heated, while stirring by, for example, a homomixer at a rotation of 3,000 to 15,000 rpm, to a temperature at which the O/W type emulsion is gelled, while stirring the O/W type emulsion; (3) the resultant O/W type emulsion gel is further heated to a temperature at which the O/W type emulsion is phase inverted to a W/O type emulsion gel; (4) the resultant W/O type emulsion gel is cooled to a temperature below the gelling temperature of the step (2), to convert the W/O type emulsion gel to an O/W type emulsion; and then, the resultant product is stirred at a temperature of 40° C. or less to provide an O/W type emulsion containing no solvent and stable to dilution with water.

The gelling temperature of the step (2) is established in accordance with the physical properties of the components (b), (c) and (d) and the mixing ratio of the components (a) to (d) to each other. Also, the phase invertion temperature of the step (3) is significantly influenced by the physical property of the low molecular weight surfactant (d).

The oily substance is not limited to a specific type of substances as long as the oily substance (b) and water (c) can form interface therebetween. Namely, the oily substance is not required to serve as an organic solvent. The oily substance may consist of an oily effective material alone or an oily liquid material alone or a mixture of an oily effective material of an oily liquid material. The oily substance (2) is preferably employed in an amount of 1 to 30% by weight, more preferably 4 to 20% by weight, based on the total weight of the O/W type emulsion.

The high molecular weight surfactant (c) is preferably employed in an amount of 0.5 to 20% by weight, more preferably 4 to 10% by weight, based on the total weight of the O/W type emulsion.

The low molecular weight surfactant (d) is preferably employed in an amount of 0.5 to 20% by weight, more preferably 0.5 to 10% by weight, based on the total weight of the O/W type emulsion.

In an embodiment (1) of the process of the present invention, after the cooling step (4), (4a) the O/W type emulsion prepared in the step (4) is mixed with a water-scant soluble particulate solid substance comprising at least one member selected from the group consisting of solid effective materials and solid auxiliary additives, to suspend the particulate solid substance in the O/W type emulsion, and then the resultant mixture of the step (4a) is subjected to the stirring procedure of the step (5).

The solid effective materials and the solid auxiliary additives are selected from the materials as mentioned above.

The particulate solid substance is preferably employed in an amount of 0.1 to 10% by weight, more preferably 0.1 to 5% by weight, based on the total weight of the W/O type emulsion.

The solid substance comprises a solid effective material alone or a solid auxiliary additive alone, or a mixture of a solid effective material with a solid auxiliary additive.

The average particle (droplet) size of the O/W type emulsion produced by the process of the present invention can be very easily determined by a particle size tester. Therefore, it is easy to determine whether the average particle size of the resultant O/W type emulsion conforms to the target size. A laser type particle size tester is, for example, Coulter LS130, made of K.K. Nikkaki.

In above-mentioned embodiment, the oily substance comprises at least one oily liquid material only. In this case, the embodiment (2) of the process comprises the steps of:

(1) mixing (a) water with (b) an oily substance comprising at least one oily liquid material, the oily substance and water being capable of forming an interface therebetween, (c) a high molecular weight surfactant and (d) a low molecular weight surfactant, at a temperature of 40° C. or less, while stirring the mixture to provide an O/W type emulsion;

(2) increasing the temperature of the O/W type emulsion, while stirring the emulsion, until the O/W type emulsion is uniformly gelled;

(3) further increasing the temperature of the O/W type emulsion gel until the O/W type emulsion gel is phase-inverted to a W/O type emulsion gel;

(4) cooling the W/O type emulsion gel to a temperature below the gelling temperature in the step (2), to contact the W/O type emulsion gel to a O/W type emulsion;

(4a) mixing a substantially water-insoluble particulate solid substance comprising at least one member selected from the group consisting of solid effective materials and solid auxiliary additives, into the cooled O/W type emulsion; and (5) stirring the resultant mixture at a temperature of 40° C. or less, to prepare a O/W type emulsion mixed with the particulate solid substance, containing no solvent and stable to dilution with water.

Another embodiment (3) of the process of the present invention, further comprises, after the cooling step (4), the steps of:

(4b) mixing a water-scant soluble particulate solid effective material and an additional high molecular weight surfactant into the cooled O/W type emulsion, while stirring the mixture at a temperature of 40° C. or less; and (4c) further mixing an additional low molecular weight surfactant having a molecular weight of 1100 or less and of at least 400 below each of the molecular weight of the high molecular weight surfactant and the additional high molecular weight surfactant, into the mixture, to provide a mixture of a suspension of the solid effective material in the O/W type emulsion, in which the resultant suspension-containing O/W type emulsion of the step (4c) is subjected to the stirring procedure of the step (5).

Still another embodiment (4) of the process of the present invention further comprises, between the cooling step (4) and the mixing step (4b), the step of:

(4d) adding an additional particulate solid effective material which is scant soluble in water and soluble in the oily substance, into the O/W type emulsion produced in the step (4), while stirring the mixture at a temperature of 40° C. or less, to allow the additional particulate solid effective material to be dissolved in the oil substance in the O/W type emulsion, in which the resultant O/W type emulsion obtained in the step (4d) is subjected to the mixing procedure of the step (4b).

Further another embodiment (5) of the process of the present invention further comprises the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less and of at least 400 below that of the high molecular weight surfactant and the additional high molecular weight surfactant; and (7) mixing the resultant solid effective material suspension into the O/W type emulsion prepared in the step (4), in which the resultant mixture of the step (7) is subjected to the stirring procedure of the step (5).

Still further another embodiment (6) of the process of the present invention further comprises the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less and of at least 400 below that of the additional high molecular weight surfactant;

(4b) next to the cooling step (4), adding an additional particulate solid effective material which is scant soluble in water and soluble in the oily substance, into the O/W type emulsion produced in the step (4), while stirring the mixture at a temperature of 40° C. or less, to allow the additional particulate solid effective material to be dissolved in the oily substance in the O/W type emulsion; and (7a) mixing the solid effective material suspension of the step (6) into the O/W type emulsion of the step (4b), in which the resultant mixture of the step (7a) is subjected to the stirring procedure of the step (5).

In the above-mentioned embodiments (3) to (6) of the process of the present invention, the solid effective material is preferably selected from the group consisting of cosmetic materials, dyes, pigments, food materials, medicaments, agricultural chemicals, sanitary chemicals, home-use chemicals, office-use chemicals, construction and building materials, and industrial chemicals, which are the same as those mentioned above.

Also, the additional solid effective material is preferably selected from the group consisting of cosmetic materials, dyes, pigments, food materials, medicaments, agricultural chemicals, sanitary chemicals, home-use chemicals, office-use chemicals, construction and building materials and industrial chemicals, which are the same as those for the above-mentioned solid effective material.

The additional high molecular weight surfactant preferably comprises a member selected from the group consisting of cationic high molecular weight surfactants, anionic high molecular weight surfactants, nonionic high molecular surfactants, mixtures of at least one cationic high molecular weight surfactant with at least one nonionic high molecular weight surfactant, and mixtures of at least one anionic high molecular weight surfactant and at least one nonionic high molecular weight surfactant, each of the above-mentioned surfactant having a molecular weight of 1100 or more, which are the same as those for the above-mentioned high molecular weight surfactant.

the additional low molecular weight surfactant preferably comprises a member selected from the group consisting of cationic low molecular weight surfactants, anionic low molecular weight surfactants, nonionic low molecular surfactants, mixtures of at least one cationic low molecular weight surfactant with at least one nonionic low molecular weight surfactant, and mixtures of at least one anionic low molecular weight surfactant and at least one nonionic low molecular weight surfactant.

In the embodiments (4) and (6), the additional solid effective material may be the same as or different from the solid effective material.

In the embodiments (3) to (6), the additional high molecular weight surfactant may be the same as or different from the high molecular weight surfactant.

In the embodiments (3) to (6), the additional low molecular weight surfactant may be the same as or different from the low molecular weight surfactant.

In the embodiments (3), (5) and (6), preferably, the additional high molecular weight surfactant comprises at least one member selected from the group consisting of cationic high molecular weight surfactants and nonionic high molecular weight surfactants, and the additional low molecular weight surfactant comprises at least one member selected from the group consisting of cationic low molecular weight surfactants and nonionic low molecular weight surfactants.

In the embodiments (3), (5) and (6), preferably, the additional high molecular weight surfactant comprises at least one member selected from the group consisting of anionic high molecular weight surfactants and nonionic high molecular weight surfactants, and the additional low molecular weight surfactant comprises at least one member selected from the group consisting of anionic low molecular weight surfactants and nonionic low molecular weight surfactants.

In the embodiments (3), (5) and (6), preferably, the solid effective material is employed in an amount of 0.1 to 65% by weight based on the total weight of the emulsion.

Also, in the embodiments (4) and (6), preferably, the solid effective material and the additional solid effective material are used in a total amount of 0.1 to 65% by weight based on the total weight of the emulsion.

In the embodiments (3), (5) and (6), preferably the additional high molecular weight surfactant is employed in an amount of 0.5 to 20% by weight based on the total weight of the emulsion, and the additional low molecular weight surfactant is employed in an amount of 0.5 to 20% by weight based on the total weight of the emulsion.

The O/W type emulsion prepared by each of the embodiments (1) to (6) of the process of the present invention contains fine solid particles suspended in the O/W type emulsion.

Since the O/W type emulsion has a high stability in storage and a high resistance to a creaming phenomenon, the suspension of the fine solid particles can be mixed, with high stability, into the O/W type emulsion.

Also, the O/W type emulsion containing the solid particle suspension has a high stability even when diluted with water, and the water-diluted, suspension-containing O/W type emulsion can be stored or employed with a high stability for a long time. Therefore, the suspension-containing O/W type emulsion of the present invention can exhibit a satisfactory sustained release property while maintaining a high diffusing property and reduced damage from the chemicals.

In the process of the present invention for producing the suspension-containing O/W type emulsion, two or more effective materials which may be significantly different in physicochemical properties from each other can be easy contained, without using organic solvent.

In the suspension-containing O/W type emulsion of the present invention, the solid particles can be stably suspended in the O/W type emulsion even when the solid particles have a large particle size of, for example, 100 to 1000 μm.

The suspension-containing O/W type emulsion of the present invention can be utilized in various field, for example, cosmetic materials, dyes, pigments, food materials, medicaments, agricultural chemicals, sanitary chemicals, home-use chemicals, office-use chemicals, construction and building materials and industrial chemicals.

EXAMPLES

The present invention will be further illustrated by the following examples which are merely representative and do not limit the scope of the present invention in any way.

In the examples and comparative examples, "part" and "%" are based on weight, unless particularly specified.

Example 1

A mixture of 84 parts of water with 3 parts of a POE-POP block copolymer (wherein the polymerization degree of the POE blocks was 5 and the polymerization degree of the POP blocks was 35), 2 parts of a POE-nonylphenylether (wherein the polymerization degree of the POE group was 14) and 10 parts of cotton seed oil was stirred at a temperature of 40° C. or less by a homomixer at a rotation of 5000 rpm for 30 minutes, and then was added with 1 part of a silicone-defoaming agent (trademark: DK QB-8011, made by DOW CORNING ASIA CO.). The resultant O/W type emulsion was heated to a temperature of 55° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 68° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 55° C., to convert the W/O type emulsion gel to an O/W type emulsion.

Then the resultant O/W type emulsion was stirred at a temperature of 40° C. or less by a homomixer at a rotation of 5,000 rpm for 30 minutes.

A solvent-less O/W type emulsion was obtained.

Example 2

A mixture of 83 parts of water with 4 parts of a POE-POP block copolymer (wherein the polymerization degree of the POE blocks was 10 and the polymerization degree of the POP blocks was 30), 2 parts of a POE-nonylphenylether (wherein the polymerization degree of the POE group was 16) and 10 parts of flax seed oil was stirred at a temperature of 35° C. or less by a homomixer at a rotation of 5000 rpm for 30 minutes, and then was added with 1 part of a silicone-defoaming agent (trademark: DK QB-8011, made by DOW CORNING ASIA CO.). The resultant O/W type emulsion was heated to a temperature of 51° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 69° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 51° C., to convert the W/O type emulsion gel to an O/W type emulsion.

Then the resultant O/W type emulsion was stirred at a temperature of 35° C. or less by a homomixer at a rotation of 5,000 rpm for 30 minutes.

A solvent-less O/W type emulsion was obtained.

Example 3

A mixture of 82 parts of water with 5 parts of a POE-POP block copolymer (wherein the polymerization degree of the POE blocks was 12 and the polymerization degree of the POP blocks was 35), 2 parts of a POE-nonylphenylether (wherein the polymerization degree of the POE group was 18) and 10 parts of corn oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.). The resultant O/W type emulsion was heated to a temperature of 48° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 72° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 48° C., to convert the W/O type emulsion gel to an O/W type emulsion.

Then the resultant O/W type emulsion was stirred at a temperature of 40° C. or less by a homomixer at a rotation of 5,000 rpm for 30 minutes.

A solvent-less O/W type emulsion was obtained.

Example 4

A mixture of 81 parts of water with 5 parts of a POE-POP block copolymer (wherein the polymerization degree of the POE blocks was 5 and the polymerization degree of the POP blocks was 35), 3 parts of a POE-nonylphenylether (wherein the polymerization degree of the POE group was 14) and 10 parts of olive oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.). The resultant O/W type emulsion was heated to a temperature of 46° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 74° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 46° C., to convert the W/O type emulsion gel to an O/W type emulsion.

Then the resultant O/W type emulsion was stirred at a temperature of 40° C. or less by a homomixer at a rotation of 5,000 rpm for 30 minutes.

A solvent-less O/W type emulsion was obtained.

Example 5

A mixture of 80 parts of water with 6 parts of a POE-POP block copolymer (wherein the polymerization degree of the POE blocks was 10 and the polymerization degree of the POP blocks was 30), 3 parts of a POE-nonylphenylether (wherein the polymerization degree of the POE group was 14) and 10 parts of peanut oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.). The resultant O/W type emulsion was heated to a temperature of 44° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 76° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 44° C., to convert the W/O type emulsion gel to an O/W type emulsion.

Then the resultant O/W type emulsion was stirred at a temperature of 40° C. or less by a homomixer at a rotation of 5,000 rpm for 30 minutes.

A solvent-less O/W type emulsion was obtained.

Example 6

A mixture of 79 parts of water with 7 parts of a POE-POP block copolymer (wherein the polymerization degree of the POE blocks was 12 and the polymerization degree of the POP blocks was 35), 3 parts of a POE-nonylphenylether (wherein the polymerization degree of the POE group was 16) and 10 parts of a mineral machine oil was stirred at a temperature of 35° C. or less by a homomixer at a rotation of 5000 rpm for 30 minutes, and then was added with 1 part of a silicone-defoaming agent (trademark: QB-8011, made by DOW CORNING ASIA CO.). The resultant O/W type emulsion was heated to a temperature of 42° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 78° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 42° C., to convert the W/O type emulsion gel to an O/W type emulsion.

Then the resultant O/W type emulsion was stirred at a temperature of 35° C. or less by a homomixer at a rotation of 5,000 rpm for 30 minutes.

A solvent-less O/W type emulsion was obtained.

Example 7

A mixture of 78 parts of water with 4 parts of a POE-POP block copolymer (wherein the polymerization degree of the POE blocks was 5 and the polymerization degree of the POP blocks was 35), 3 parts of a POE-POP block copolymer (wherein the polymerization degree of the POE blocks was 10 and the polymerization of POP blocks was 30), 2 parts of a POE-nonylphenylether (wherein the polymerization degree of the POE group was 14), 2 parts of a POE-nonylphenylether (in which the polymerization degree of the POE group was 18), and 10 parts of perhydrosqualene (which is an animal oil) was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.). The resultant O/W type emulsion was heated to a temperature of 40° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 80° C. to cause the O/W type emulsion gel to be phase inverted to a W/O type emulsion gel.

After the uniform complete phase inversion of the emulsion gel was confirmed, the W/O type emulsion gel was cooled to a temperature equal to the gelling temperature of 40° C., to convert the W/O type emulsion gel to an O/W type emulsion.

Then the resultant O/W type emulsion was stirred at a temperature of 40° C. or less by a homomixer at a rotation of 5,000 rpm for 30 minutes.

A solvent-less O/W type emulsion was obtained.

The preparation conditions of the O/W type emulsions of Examples 1 to 7 are shown in Table 1. Also, combinations of the high molecular weight surfactants and the low molecular weight surfactants used in Examples 1 to 7 are shown in Table 3.

Example 8

A mixture of 88 parts of water with 1 part of a POE-POP block copolymer (wherein the polymerization degree of the POE blocks was 5 and the polymerization degree of the POP blocks was 30), 1 part of a POE-nonylphenylether (wherein the polymerization degree of the POE group was 14) and 4 parts of soybean oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.) and 4 parts of ethyleneglycol. The resultant O/W type emulsion was heated to a temperature of 45° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 72° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 45° C., to convert the W/O type emulsion gel to an O/W type emulsion. In the cooling procedure, when the temperature of emulsion reached 50° C., 5 parts of 2',3'-dichloro-4-ethoxymethoxy-benzanilide was added to the emulsion.

Then the resultant O/W type emulsion was stirred at a temperature of 40° C. or less by a homomixer at a rotation of 5,000 rpm for 30 minutes.

A solvent-less O/W type emulsion was obtained.

Example 9

A mixture of 70 parts of water with 1 part of a POE-POP block copolymer (wherein the polymerization degree of the POE blocks was 5 and the polymerization degree of the POP blocks was 30), 1 part of a POE-nonylphenylether (wherein the polymerization degree of the POE group was 14) and 4 parts of cotton seed oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.) and 4 parts of ethyleneglycol. The resultant O/W type emulsion was heated to a temperature of 45° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 72° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 45° C., to convert the W/O type emulsion gel to an O/W type emulsion. In the cooling procedure, when the temperature of the emulsion reached 50° C., 10 parts of 3-(3,4-dichlorophenyl)-1,1-dimethyl urea were added to the emulsion.

Then the resultant O/W type emulsion was stirred at a temperature of 40° C. or less by a homomixer at a rotation of 5,000 rpm for 30 minutes.

A solvent-less O/W type emulsion was obtained.

Example 10

A mixture of 53 parts of water with 5 parts of a POE-POP block copolymer (wherein the polymerization degree of the POE blocks was 5 and the polymerization degree of the POP blocks was 30), 2 parts of a POE-nonylphenylether (wherein the polymerization degree of the POE group was 14) and 15 parts of machine oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.) and 4 parts of ethyleneglycol. The resultant O/W type emulsion was heated to a temperature of 45° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 72° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 45° C., to convert the W/O type emulsion gel to an O/W type emulsion. In the cooling procedure, when the temperature of the emulsion reached 50° C., 20 parts of 2-[4-(2,3-dichlorophenylcarbamoyl)phenoxy] propionic acid-sodium salt were added to the emulsion.

Then the resultant O/W type emulsion was stirred at a temperature of 40° C. or less by a homomixer at a rotation of 5,000 rpm for 30 minutes.

A solvent-less O/W type emulsion was obtained.

Example 11

A mixture of 67 parts of water with 5 parts of a POE-POP block copolymer (wherein the polymerization degree of the POE blocks was 5 and the polymerization degree of the POP blocks was 30), 2 parts of a POE-nonylphenylether (wherein the polymerization degree of the POE group was 14) and 15 parts of machine oil was stirred at a temperature of 40° C. or less by a homomixer at a rotation of 5000 rpm for 30 minutes, and then was added with 1 part of a silicone-defoaming agent (trademark: QB-8011, made by DOW CORNING ASIA CO.) and 4 parts of ethyleneglycol. The resultant O/W type emulsion was heated to a temperature of 45° C. and stirred by a homomixer at a rotation of 5,000 rpm for 30 minutes to cause the O/W type emulsion to gel. After the uniform complete gelation of the O/W type emulsion was confirmed, the gelled emulsion was heated to a temperature of 72° C. to cause the O/W type emulsion gel to be phase inverted to a W/O type emulsion gel.

After the uniform complete phase inversion of the emulsion gel was confirmed, the W/O type emulsion gel was cooled to a temperature below the gelling temperature of 45° C., to convert the W/O type emulsion gel to an O/W type emulsion. In the cooling procedure, when the temperature of the emulsion reached 50° C., 5 parts of 2-anilino-3-methyl-6-dibutylaminofluoran were added to the emulsion.

Then the resultant O/W type emulsion was stirred at a temperature of 40° C. or less by a homomixer at a rotation of 5,000 rpm for 30 minutes.

A solvent-less O/W type emulsion usable for thermosensitive recording sheets was obtained.

Comparative Example 1

A mixture of 84 parts of water with 3 parts of a POE-POP block copolymer (wherein the polymerization degree of the POE blocks was 5 and the polymerization degree of the POP blocks was 35), 2 parts of a POE-nonylphenylether (wherein the polymerization degree of the POE group was 14), 1 part of DK QB-8011 (trademark, made by DOW CORNING ASIA CO.) and 10 parts of cotton seed oil was stirred at a temperature of 40° C. or less by a homomixer at a rotation of 5000 rpm for 30 minutes, to provide an O/W type emulsion.

Comparative Examples 2 to 7

In each of Comparative Examples 2 to 7, an O/W type emulsion was prepared by the same procedures as in Comparative Example 1, except that the composition of the emulsion and operation conditions were as shown in Table 2.

The typical combinations of the high molecular weight surfactants and the low molecular weight surfactants are shown in Table 3.

TABLE 1

| | Example No. Example | | | | | | |
|---|---|---|---|---|---|---|---|
| Item | 1 | 2 | 3 | 4 | 5 | 6 | 7 |
| Cotton seed oil (g) | 10 | — | — | — | — | — | — |
| Flax seed oil (g) | — | 10 | — | — | — | — | — |
| Corn oil (g) | — | — | 10 | — | — | — | — |
| Olive oil (g) | — | — | — | 10 | — | — | — |
| Peanut oil (g) | — | — | — | — | 10 | — | — |
| Mineral oil (g) | — | — | — | — | — | 10 | — |
| Animal oil (g) | — | — | — | — | — | — | 10 |
| Water (ml) | 84 | 83 | 82 | 81 | 80 | 79 | 78 |
| High molecular weight surfactant (g) | 3 | 4 | 5 | 5 | 6 | 7 | 7 |
| Low molecular weight surfactant (g) | 2 | 2 | 2 | 3 | 3 | 3 | 4 |
| Defoaming agent (g) | 1 | 1 | 1 | 1 | 1 | 1 | 1 |
| Stirring rate (rotation, rpm) | 5000 | 5000 | 5000 | 5000 | 5000 | 5000 | 5000 |
| Average emulsion particle size of ($\mu$m) | 0.59 | 0.53 | 0.57 | 0.62 | 0.54 | 0.61 | 0.54 |
| Creaming phenomenon (*)$_1$ | none | none | none | none | none | none | none |
| Average emulsion particle size (*)$_1$ ($\mu$m) | 0.62 | 0.54 | 0.60 | 0.66 | 0.55 | 0.58 | 0.54 |

Note: (*)$_1$ . . . Measured after storage at 50° C. for one month

TABLE 2

| | Example No. Comparative Example | | | | | | |
|---|---|---|---|---|---|---|---|
| Item | 1 | 2 | 3 | 4 | 5 | 6 | 7 |
| Cotton seed oil (g) | 10 | — | — | — | — | — | — |
| Flax seed oil (g) | — | 10 | — | — | — | — | — |
| Corn oil (g) | — | — | 10 | — | — | — | — |

TABLE 2-continued

| Item | Example No. Comparative Example | | | | | | |
|---|---|---|---|---|---|---|---|
| | 1 | 2 | 3 | 4 | 5 | 6 | 7 |
| Olive oil (g) | — | — | — | 10 | — | — | — |
| Peanut oil (g) | — | — | — | — | 10 | — | — |
| Mineral oil (g) | — | — | — | — | — | 10 | — |
| Animal oil (g) | — | — | — | — | — | — | 10 |
| Water (ml) | 84 | 83 | 82 | 81 | 80 | 79 | 78 |
| High molecular weight surfactant (g) | 3 | 4 | 5 | 5 | 6 | 7 | 7 |
| Low molecular weight surfactant (g) | 2 | 2 | 2 | 3 | 3 | 3 | 4 |
| Defoaming agent (g) | 1 | 1 | 1 | 1 | 1 | 1 | 1 |
| Stirring rate (rotation, rpm) | 10000 | 10000 | 10000 | 10000 | 10000 | 10000 | 10000 |
| Average emulsion particle size of (μm) | 0.98 | 0.87 | 1.20 | 1.87 | 2.11 | 5.46 | 4.38 |
| Creaming phenomenon (*)$_1$ | Occurred | Occurred | Occurred | Occurred | Occurred | Occurred | Occurred |
| Average emulsion particle size (*)$_1$ (μm) | 21.32 | 18.71 | 38.09 | 26.19 | 28.09 | 33.38 | 42.07 |

Note: (*)$_1$ . . . Measured after storage at 50° C. for one month

TABLE 3

| Combination of high molecular weight surfactant with low molecular weight surfactant | |
|---|---|
| High molecular weight surfactant | Low molecular weight surfactant |
| POE (PD = 5) – POP (PD = 35) block copolymer | POE-nonylphenylether (HLB = 11.6) |
| Copolymer of maleic anhydride with acrylic acid | POE-sorbitan oleate (HLB = 12) |
| POE-POP triblock copolymer P84 (MM:4200) (HLB = 14) | POE-laurylether (HLB = 13.1) |
| Alkali metal salt of polystyrene sulfonic acid | POE-octylphenylether (HLB = 16.2) |
| Melamine sulfonic acid-formaldehyde condensation reaction product | POE-nonylphenylether (HLB = 10.6) |
| POE (PD = 12) – POP (PD = 35) | POE-alkylether |

TABLE 3-continued

| Combination of high molecular weight surfactant with low molecular weight surfactant | |
|---|---|
| High molecular weight surfactant | Low molecular weight surfactant |
| block copolymer POE (PD = 5) – POP (PD = 35) block copolymer + POE (PD = 10) – POP (PD = 30) block copolymer Mixing ratio = 50/50 | (HLB = 15.4) POE-nonylphenylether (HLB = 12.9) + POE-nonylphenylether (HLB = 11.2) Mixing ratio = 50/50 |

Note: PD . . . Polymerization degree

Table 4 shows practical examples of combinations of high molecular weight surfactants with low molecular weight surfactants, usable for the process of the present invention.

TABLE 4

| High molecular weight surfactant | | Low molecular weight surfactant | |
|---|---|---|---|
| POE (5)-POP (35) block copolymer | Alkalimetal salt of acrylic acid polymer | POE-nonylphenylether (HLB = 11.6) | POE-sorbitan laurate (HLB = 16.8) |
| POE (10)-POP (30) block copolymer | Amine salt of acrylic acid polymer | POE-nonylphenylether (HLB = 12.3) | POE-sorbitan oleate (HLB = 12) |
| POE (12)-POP (30) block copolymer | Ammonium salt of acrylic acid polymer | POE-nonylphenylether (HLB = 12.9) | POE-sorbitan oleate (HLB = 15.1) |
| POE (8)-POP (35) block copolymer | Carboxymethyl-cellulose | POE-nonylphenylether (HLB = 11.2) | POE-sorbitan oleate (HLB = 11.4) |
| POE (10)-POP (35) block copolymer | Polyvinyl alcohol | POE-nonylphenylether (HLB = 10.6) | POE-sorbitan stearate (HLB = 15) |
| POE (12)-POP (35) block copolymer | Dextrin-fatty acid ester | POE-nonylphenylether (HLB = 12.3) | POE-alkylether (HLB = 15.4) |
| No salt of polyepoxy succinic acid | POE-POP triblock polymer L64 (MW = 2900) (HLB = 15) | POE-alkylether (HLB = 17.4) | POE-octylphenylether (HLB = 11.2) |
| Maleic anhydride-acrylic acid copolymer | POE-POP triblock polymer P65 (MW = 3400) (HLB = 17) | POE-laurylether (HLB = 10.8) | POE-octylphenylether (HLB = 13.2) |
| Itaconic acid-acrylic acid | POE-POP triblock polymer P84 | POE-laurylether (HLB = 13.1) | POE-octylphenylether |

TABLE 4-continued

| High molecular weight surfactant | | Low molecular weight surfactant | |
|---|---|---|---|
| copolymer | (MW = 4200) HLB = 14) | | (HLB = 13.6) |
| Alkali metal salt of polystyrenesulfonic acid | POE-POP triblock polymer P85 (MW = 4600) (HLB = 16) | POE-laurylether (HLB = 14) | POE-octylphenylether (HLB = 16.2) |
| Melamine sulfonic acid-formaldehyde condensation reaction product | POE-POP triblock polymer P103 (MW = 4950) (HLB = 9) | POE-laurylether (HLB = 16.5) | POE-octylphenylether (HLB = 17.3) |
| Ethylene diamine-POE-POP block copolymer | POE-POP triblock polymer P105 (MW = 6500) (HLB = 15) | POE-octylphenylether (HLB = 10.3) | POE-tridecylether (HLB = 13.7) |

Note: The numbers in parenthesises show polymerization degree.

The products of Examples 1 to 4 and comparative Examples 1 to 3 were subjected to the following tests.

Test 1

A sample of the O/W type emulsion of each of Examples 1 to 4 and Comparative Examples 1 to 3 was subjected to a measurement of average particle size immediately after the preparation of the emulsion or after a storage at a temperature of 50° C. for one month.

The average particle size measurement was carried out by diluting the sample 1000 times with distilled water, and measuring the average particle size of the emulsion particles in the diluted emulsion by a laser type particle size tester (made by Coulter K.K.).

The measurement results are shown in Table 5.

Test 2

A sample of the O/W type emulsion of each of Examples 1 to 4 and Comparative Examples 1 to 3 was diluted 1000 times with distilled water, and the changes in appearance of the emulsion sample and in average particle size of the emulsion particles with the lapse of storage time was checked. The test results are shown in Table 5.

TABLE 5

| | | | Example No. | | | | | |
|---|---|---|---|---|---|---|---|---|
| | | | Example | | | | Comparative Example | |
| Item | | 1 | 2 | 3 | 4 | 1 | 2 | 3 |
| Average particle size (μm) | Immediately after preparation | 0.59 | 0.53 | 0.57 | 0.62 | 0.98 | 0.87 | 0.20 |
| | After one month storage at 50° C. | 0.56 | 0.58 | 0.63 | 0.79 | — | — | — |
| Change in emulsion appearance with storage time (hr) | 1 | None(*)$_1$ | None(*)$_1$ | None(*)$_1$ | None(*)$_1$ | None(*)$_1$ | None(*)$_1$ | None(*)$_1$ |
| | 2 | " | " | " | " | " | " | " |
| | 3 | " | " | " | " | SPS(*)$_2$ | SPS(*)$_2$ | SPS(*)$_2$ |
| | 4 | " | " | " | " | " | " | " |
| | 5 | " | " | " | " | PS(*)$_3$ | PS(*)$_3$ | PS(*)$_2$ |
| | 24 | " | " | " | " | " | " | " |
| | 48 | " | " | " | " | " | " | " |
| | 96 | " | " | " | " | " | " | " |
| | 120 | " | " | " | " | " | " | " |
| | 144 | " | " | " | " | " | " | " |

Note:
(*)$_1$ ... No change in emulsion appearance occurred
(*)$_2$ ... Slight phase separation occurred. Able to return to perfect emulsion by light shaking
(*)$_3$ ... Complete phase separation occurred Impossible to return to satisfactory emulsion In the observation of the sample after the one month storage at 50° C., it was determined whether a creaming phenomenon occurred in the stored sample. The creaming phenomenon refers to such a phenomenon that since the oily substance particles in an O/W type emulsion have a lower density than that of water, the oily substance particles rise to the surface of the emulsion due to a buoyant force and are concentrated on the surface to form a creamy layer.

Table 5 shows that the no-solvent-containing O/W type emulsions prepared by the process of the present invention have a significantly higher storage stability than conventional O/W type emulsions.

Example 12

A mixture was prepared by mixing 46 parts of water with 3 parts of a POE (PD=5)-POP (PD=35) block copolymer, 2 parts of POE (PD=14)-nonylphenylether and 10 parts of cotton seed oil, and stirring at a temperature of 40° C. or less by using a homomixer at a rotation of 5,000 rpm for 30 minutes to provide an O/W type emulsion.

The O/W type emulsion was added with one part of a silicone defoaming agent (trademark: DK QB 8011, made by DOW CORNING ASIA CO.), and heated to a temperature of 55° C., while stirring by a homomixer at a rotation of 5,000 rpm for 30 minute, to gel the emulsion. After the completion of uniform gelation of the emulsion was confirmed, the O/W type emulsion gel was heated to a temperature of 68° C. to phase invert the O/W type emulsion gel to a W/O type emulsion gel.

After the completion of the uniform phase inversion was confirmed, the W/O type emulsion was cooled to a temperature below the gelling temperature of 55° C., to convert the W/O type emulsion gel to an O/W type emulsion. The emulsion was stirred by a homomixer at a rotation of 5,000 rpm at a temperature of 40° C. or less for 30 minutes, to provide a solvent-less O/W type emulsion.

The emulsion was mixed with 30 parts of 2',3'-dichloro-4-ethoxymethoxybenzanilide and then with 3 parts of a POE (PD=5)-POP (PD=35) block copolymer and 2 parts of a POE (PD=14)-nonylphenylether, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)-alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes. A solid particle suspension-containing O/W type emulsion was obtained.

Example 13

A mixture was prepared by mixing 45 parts of water with 4 parts of a POE (PD=10)-POP (PD=30) block copolymer, 2 parts of POE (PD =16)-nonylphenylether and 10 parts of flax seed oil, and stirring at a temperature of 35° C. or less by using a homomixer at a rotation of 5,000 rpm for 30 minutes to provide an O/W type emulsion.

The O/W type emulsion was added with one part of a silicone defoaming agent (trademark: DK QB 80 11, made by DOW CORNING ASIA CO.), and heated to a temperature of 51° C., while stirring by a homomixer at a rotation of 5,000 rpm for 30 minute, to gel the emulsion. After the completion of uniform gelation of the emulsion was confirmed, the O/W type emulsion gel was heated to a temperature of 69° C. to phase-invert the O/W type emulsion gel to a W/O type emulsion gel.

After the completion of the uniform phase inversion was confirmed, the W/O type emulsion was cooled to a temperature below the gelling temperature of 51° C., to convert the W/O type emulsion gel to an O/W type emulsion. The emulsion was stirred by a homomixer at a rotation of 5,000 rpm at a temperature of 35° C. or less for 30 minutes, to provide a solvent-less O/W type emulsion.

The emulsion was mixed with 30 parts of 3-(3,4-dichlorophenyl)-1,1-dimethylurea and then with 3 parts of a POE (PD=5)-POP (PD=35) block copolymer and 2 parts of a POE (PD=14)-nonyl-phenylether, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)-alkylarylether, 1.4 parts of an alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes. A solid particle suspension-containing O/W type emulsion was obtained.

Example 14

A mixture was prepared by mixing 44 parts of water with 5 parts of a POE (PD=12)-POP (PD=35) block copolymer, 2 parts of POE (PD=18)-nonylphenylether and 10 parts of corn oil, and stirring at a temperature of 40° C. or less by using a homomixer at a rotation of 5,000 rpm for 30 minutes to provide an O/W type emulsion.

The O/W type emulsion was added with one part of a silicone defoaming agent (trademark: DK QB 8011, made by DOW CORNING ASIA CO.), and heated to a temperature of 48° C., while stirring by a homomixer at a rotation of 5,000 rpm for 30 minute, to gel the emulsion. After the completion of uniform gelation of the emulsion was confirmed, the O/W type emulsion gel was heated to a temperature of 72° C. to phase invert the O/W type emulsion gel to a W/O type emulsion gel.

After the completion of the uniform phase inversion was confirmed, the W/O type emulsion was cooled to a temperature below the gelling temperature of 48° C., to convert the W/O type emulsion gel to an O/W type emulsion. The emulsion was stirred by a homomixer at a rotation of 5,000 rpm at a temperature of 40° C. or less for 30 minutes, to provide a solvent-less O/W type emulsion.

The emulsion was mixed with 30 parts of a sodium salt of 2-[4-(2,3-dichlorophenyl-carbamoyl)phenoxy]propionic acid and then with 3 parts of a POE (PD=5)-POP (PD=35) block copolymer and 2 parts of a POE (PD=14)-nonylphenylether, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)-alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes. A solid particle suspension-containing O/W type emulsion was obtained.

Example 15

A mixture was prepared by mixing 43 parts of water with 5 parts of a POE (PD=5)-POP (PD=35) block copolymer, 3 parts of POE (PD=14)-nonylphenylether and 10 parts of olive oil, and stirring at a temperature of 40° C. or less by using a homomixer at a rotation of 5,000 rpm for 30 minutes to provide an O/W type emulsion.

The O/W type emulsion was added with one part of a silicone defoaming agent (trademark: DK QB 8011, made by DOW CORNING ASIA CO.), and heated to a temperature of 46° C., while stirring by a homomixer at a rotation of 5,000 rpm for 30 minute, to gel the emulsion. After the completion of uniform gelation of the emulsion was confirmed, the O/W type emulsion gel was heated to a temperature of 74° C. to phase-invert the O/W type emulsion gel to a W/O type emulsion gel.

After the completion of the uniform phase inversion was confirmed, the W/O type emulsion was cooled to a temperature below the gelling temperature of 46° C., to convert the W/O type emulsion gel to an O/W type emulsion. The emulsion was stirred by a homomixer at a rotation of 5,000 rpm at a temperature of 40° C. or less for 30 minutes, to provide a solvent-less O/W type emulsion.

The emulsion was mixed with 30 parts of 2-anilino-3-methyl-6-dibutylaminofluoran and then with 3 parts of a POE (PD=5)-POP (PD=35) block copolymer and 2 parts of a POE (PD=14)-nonyl-phenylether, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)- alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes. A solid particle suspension-containing O/W type emulsion was obtained.

Example 16

A mixture was prepared by mixing 45 parts of water with 4 parts of a POE (PD=5)-POP (PD=30) block copolymer, 3 parts of POE (PD=14)-nonylphenylether and 4 parts of soybean oil, and stirring at a temperature of 40° C. or less by using a homomixer at a rotation of 5,000 rpm for 30 minutes to provide an O/W type emulsion.

The O/W type emulsion was added with one part of a silicone defoaming agent (trademark: DK QB 8011, made by DOW CORNING ASIA CO.) and 4 parts of ethyleneglycol, and heated to a temperature of 45° C., while stirring by a homomixer at a rotation of 5,000 rpm for 30 minute, to gel the emulsion. After the completion of uniform gelation of the emulsion was confirmed, the O/W type emulsion gel was heated to a temperature of 72° C. to phase invert the O/W type emulsion gel to a W/O type emulsion gel.

After the completion of the uniform phase inversion was confirmed, the W/O type emulsion was cooled to a temperature below the gelling temperature of 45° C. In the cooling procedure, when the temperature of the emulsion reached 50° C., the emulsion was mixed with 5 parts of 2',3'-dichloro-4-ethoxymethoxybenzanilide. By the cooling procedure, the W/O type emulsion gel was converted to an O/W type emulsion. The mixed emulsion was stirred by a homomixer at a rotation of 8,000 rpm at a temperature of 40° C. or less for 30 minutes.

The resultant emulsion was mixed with 30 parts of 3-(3,4-dichlorophenyl)-1,1-dimethylurea and then with 3 parts of a POE (PD=5)-POP (PD=35) block copolymer and 2 parts of a POE (PD=14)-nonyl-phenylether, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)-alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes. A solid particle suspension-containing O/W type emulsion was obtained.

Example 17

A mixture was prepared by mixing 45 parts of water with 4 parts of a POE (PD=5)-POP (PD=30) block copolymer, 3 parts of POE (PD=14)-nonylphenylether and 4 parts of soybean oil, and stirring at a temperature of 40° C. or less by using a homomixer at a rotation of 5,000 rpm for 30 minutes to provide an O/W type emulsion.

The O/W type emulsion was added with one part of a silicone defoaming agent (trademark: DK QB 8011, made by DOW CORNING ASIA CO.) and 4 parts by ethyleneglycol, and heated to a temperature of 45° C., while stirring by a homomixer at a rotation of 5,000 rpm for 30 minute, to gel the emulsion. After the completion of uniform gelation of the emulsion was confirmed, the O/W type emulsion gel was heated to a temperature of 72° C. to phase invert the O/W type emulsion gel to a W/O type emulsion gel.

After the completion of the uniform phase inversion was confirmed, the W/O type emulsion was cooled to a temperature below the gelling temperature of 45° C. In the cooling procedure, when the temperature reached 50° C., the mixture was added with 5 parts of 2',3'-dichloro-4-ethoxymethoxybenzanilide. By the cooling procedure, the W/O type emulsion gel was converted to an O/W type emulsion. The emulsion was stirred by a homomixer at a rotation of 8,000 rpm at a temperature of 40° C. or less for 30 minutes, to provide a solvent-less O/W type emulsion.

Separately, 30 parts of 3-(3,4-dichlorophenyl)-1,1-dimethylurea were mixed with 3 parts of a POE (PD=5)-POP (PD=35) block copolymer and 2 parts of a POE (PD=14)-nonyl-phenylether and 65 parts of water, and the mixture was stirred at a temperature of 40° C. or less by using a homomixer at a rotation of 8,000 rpm for 30 minutes.

Then, the mixture was further added with 0.8 part of a POE (PD=6)-alkylarylether, 0.3 part of a POE (PD=8)-alkylarylether, 1.4 parts of an alkylbenzenesulfonic acid salt and 0.5 part of a POE (PD=6)-alkylether, and the mixture was stirred at a temperature of 40° C. or less by a homomixer at a rotation of 5,000 rpm for 30 minutes, to provide an aqueous suspension. The aqueous suspension was mixed with the O/W type emulsion and the resultant mixture was stirred at a temperature of 40° C. or less by a homomixer at a rotation of 5,000 rpm for 30 minutes.

A solid suspension-containing O/W type emulsion was obtained.

Comparative Example 8

A mixture was prepared by mixing 84 parts of water with 3 parts of a POE (PD=5)-POP (PD=35) block copolymer, 2 parts of POE (PD=14)-nonylphenylether, 1 part of DK QB-8011 (trademark, made by DOW CORNING ASIA CO.) and 10 parts of cotton seed oil, and stirring at a temperature of 40° C. or less by using a homomixer at a rotation of 10,000 rpm for 30 minutes to provide an O/W type emulsion.

The O/W type emulsion was mixed with 30 parts of 2',3'-dichloro-4-ethoxymethoxybenzanilide and then with 3 parts of a POE (PD=5)-POP (PD=35) block copolymer and 2 parts of a POE (PD=14)-nonyl-phenylether, and the mixture was stirred at a temperature of 40° C. or less by using a homomixer at a rotation of 8,000 rpm for 30 minutes.

A solid particle suspension-containing O/W type emulsion was obtained.

Comparative Examples 9 and 10

In each of Comparative Examples 9 and 10, a solid suspension-containing O/W type emulsion was prepared by the same procedures as in Comparative Example 8, except that 2',3'-dichloro-4-ethoxymethoxybenzanilide was replaced by 3-(3,4-dichlorophenyl)-1,1-dimethylurea in Comparative Example 9 and by sodium salt of 2-[4-(2,3-dichlorophenyl-carbamoyl)phenoxy]propionic acid in Comparative Example 10.

The solid-suspension-containing O/W type emulsions of Examples 12 to 16 and Comparative Examples 8 to 10 were subjected to the stability test 1 mentioned above. Namely, they are stored at a temperature of 50° C. for one month and the creaming phenomenon was checked. The test results are shown in Table 6.

TABLE 6

| | Example No. | | | | | | | |
|---|---|---|---|---|---|---|---|---|
| | Example | | | | | Comparative Example | | |
| Item | 12 | 13 | 14 | 15 | 16 | 8 | 9 | 10 |
| Creaming phenomenon (50° C., 1 month) | None | None | None | None | None | Occurred | Occurred | Occurred |

Table 6 shows that the solid suspension-mixed O/W type emulsions prepared by the process of the present invention exhibited an excellent storage stability over a long time period in comparison with conventional mixture of aqueous solid suspensions with O/W type emulsions.

We claim:

1. A process for preparing an O/W type emulsion which comprises the steps of:
   (1) mixing
      (a) water with
      (b) an oily substance comprising at least one member selected from the group consisting of (i) oily effective materials which are selected from the group consisting of oily cosmetic materials, oily food materials, oily medicaments, oily agricultural chemicals, oily sanitary chemicals, oily home-use chemicals, oily office-use chemicals and oily industrial chemicals, and (ii) oily liquid materials which are different from the oily effective materials and are selected from the group consisting of vegetable oils, animal oils, mineral oils, synthetic oils, silicone oils and fluorinated oils, the oily substance (b) and water (a) being capable of forming an interface therebetween,
      (c) a high molecular weight surfactant having a molecular weight of 1100 to 700,000, and
      (d) a low molecular weight surfactant having a molecular weight of 1100 or less and of at least 400 below the molecular weight of the high molecular weight surfactant (c), at a temperature of 40° C. or less, while stirring the mixture to provide an O/W type emulsion,
   (2) increasing the temperature of the O/W type emulsion, while stirring the emulsion, until the O/W type emulsion is uniformly gelled;
   (3) further increasing the temperature of the O/W type emulsion gel until the O/W type emulsion is phase-inverted to a W/O type emulsion gel;
   (4) cooling the W/O type emulsion gel to a temperature below the gelling temperature in the step (2), to convert the W/O type emulsion gel to an O/W type emulsion; and
   (5) stirring the resultant product at a temperature of 40° C. or less, to prepare an O/W type emulsion containing no solvent and stable to dilution with water.

2. The process as claimed in claim 1, wherein the high molecular weight surfactant comprises a member selected from the group consisting of cationic high molecular weight surfactants, anionic high molecular weight surfactants, nonionic high molecular weight surfactants, mixtures of at least one cationic high molecular weight surfactant with at least one nonionic high molecular weight surfactant, and mixtures of at least one anionic high molecular weight surfactant with at least one nonionic high molecular weight surfactant.

3. The process as claimed in claim 2, wherein the nonionic high molecular weight surfactants are selected from polyoxyethylene-polyoxypropylene block copolymers wherein the polyoxyethylene blocks have a degree of polymerization of 2 to 400 and the polyoxypropylene blocks have a degree of polymerization of 2 to 200.

4. The process as claimed in claim 1, wherein the low molecular weight surfactant comprises a member selected from the group consisting of cationic low molecular weight surfactants, anionic low molecular weight surfactants, nonionic low molecular surfactants, mixtures of at least one cationic low molecular weight surfactant with at least one nonionic low molecular weight surfactant, and mixtures of at least one anionic low molecular weight surfactant and at least one nonionic low molecular weight surfactant.

5. The process as claimed in claim 1, wherein the high molecular weight surfactant comprises at least one member selected from the group consisting of cationic high molecular weight surfactants and nonionic high molecular weight surfactants, and the low molecular weight surfactant comprises at least one member selected from the group consisting of cationic low molecular weight surfactants and nonionic low molecular weight surfactants.

6. The process as claimed in claim 1, wherein the high molecular weight surfactant comprises at least one member selected from the group consisting of anionic high molecular weight surfactants and nonionic high molecular weight surfactants, and the low molecular weight surfactant comprises at least one member selected from the group consisting of anionic low molecular weight surfactants and nonionic low molecular weight surfactants.

7. The process as claimed in claim 1, wherein the oily liquid materials for the oily substance is used in an amount of 1 to 30% by weight based on the total weight of the O/W type emulsion.

8. The process as claimed in claim 1, wherein the high molecular weight surfactant is used in an amount of 0.5 to 20% by weight based on the total weight of the O/W type emulsion.

9. The process as claimed in claim 1, wherein the low molecular weight surfactant is used in an amount of 0.5 to 20% by weight based on the total weight of the O/W type emulsion.

10. The process as claimed in claim 1, further comprising, next to the cooling step (4), the step of:
   (4a) mixing a water-scant soluble particulate solid substance comprising at least one member selected from the group consisting of (i) solid effective materials comprising at least one of solid cosmetic materials, solid dyes, solid pigments, solid food material, solid medicaments, solid agricultural chemicals, solid sanitary chemicals, solid home-use chemicals, solid office-use chemicals, solid construction and building materials, and solid industrial chemicals, and (ii) solid auxiliary additives comprising at least one of solid viscosity modifiers, solid preservatives, solid mildew-proofing agents, solid anti-foaming agents and solid excipients, into the O/W type emulsion prepared in the step (4), in which the resultant mixture of step (4a) is subjected to the stirring procedure of the step (5).

11. The process as claimed in claim 10, wherein the particulate solid substance is employed in an amount of 0.1 to 10% by weight based on the total weight of the O/W type emulsion.

12. The process as claimed in claim 1, further comprising, after the cooling step (4), the steps of:

(4b) mixing a water-scant soluble particulate solid effective material and an additional high molecular weight surfactant into the cooled O/W type emulsion, while stirring the mixture at a temperature of 40° C. or less; and (4c) further mixing an additional low molecular weight surfactant having a molecular weight of 1100 or less and of at least 400 below each of the molecular weight of the high molecular weight surfactant and the additional high molecular weight surfactant, into the mixture, to provide a mixture of a suspension of the solid effective material in the O/W type emulsion, in which the resultant suspension-containing O/W type emulsion of the step (4c) is subjected to the stirring procedure of the step (5).

13. The process as claimed in claim 12, further comprising, between the cooing step (4) and the mixing step (4b), the step of:

(4d) adding an additional particulate solid effective material which is scant soluble in water and soluble in the oily substance, into the O/W type emulsion produced in the step (4), while stirring the mixture at a temperature of 40° C. or less, to allow the additional particulate solid effective material to be dissolved in the oil substance in the O/W type emulsion, in which the resultant O/W type emulsion obtained in the step (4d) is subjected to the mixing procedure of the step (4b).

14. The process as claimed in claim 1, further comprising the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less and of at least 400 below that of the high molecular weight surfactant and the additional high molecular weight surfactant; and (7) mixing the resultant solid effective material suspension into the O/W type emulsion prepared in the step (4), in which the resultant mixture of the step (7) is subjected to the stirring procedure of the step (5).

15. The process as claimed in claim 1, further comprising the steps of:

(6) preparing, separately from the steps (1) to (4), an aqueous suspension of a water-scant soluble particulate solid effective material which is substantially insoluble in the oily substance, in an aqueous medium containing an additional high molecular weight surfactant and an additional low molecular weight surfactant having a molecular weight of 1100 or less and of at least 400 below that of the additional high molecular weight surfactant;

(4b) after the cooling step (4), adding an additional particulate solid effective material which is scant soluble in water and soluble in the oily substance, into the O/W type emulsion produced in the step (4), while stirring the mixture at a temperature of 40° C. or less, to allow the additional particulate solid effective material to be dissolved in the oily substance in the O/W type emulsion; and (7a) mixing the solid effective material suspension of the step (6) into the O/W type emulsion of the step (4b), in which the resultant mixture of the step (7a) is subjected to the stirring procedure of the step (5).

16. The process as claimed in any one of claims 12, 14 and 15, wherein the solid effective material is selected from the group consisting of cosmetic materials, dyes, pigments, food materials, medicaments, agricultural chemicals, sanitary chemicals, home-use chemicals, office-use chemicals, construction and building materials, and industrial chemicals.

17. The process as claimed in any one of claims 13 and 15, wherein the additional solid effective material is selected from the group consisting of cosmetic materials, dyes, pigments, food materials, medicaments, agricultural chemicals, sanitary chemicals, home-use chemicals, office-use chemicals, construction and building materials and industrial chemicals.

18. The process as claimed in any one of claims 12, 14 and 15, wherein the additional high molecular weight surfactant comprises a member selected from the group consisting of cationic high molecular weight surfactants, anionic high molecular weight surfactants, nonionic high molecular surfactants, mixtures of at least one cationic high molecular weight surfactant with at least one nonionic high molecular weight surfactant, and mixtures of at least one anionic high molecular weight surfactant and at least one nonionic high molecular weight surfactant, each of the above-mentioned surfactants having a molecular weight of 1100 or more.

19. The process as claimed in any one of claims 12, 14 and 15, wherein the additional low molecular weight surfactant comprises a member selected from the group consisting of cationic low molecular weight surfactants, anionic low molecular weight surfactants, nonionic low molecular surfactants, mixtures of at least one cationic low molecular weight surfactant with at least one nonionic low molecular weight surfactant, and mixtures of at least one anionic low molecular weight surfactant and at least one nonionic low molecular weight surfactant.

20. The process as claimed in any one of claims 12, 14 and 15, wherein the additional high molecular weight surfactant comprises at least one member selected from the group consisting of cationic high molecular weight surfactants and nonionic high molecular weight surfactants, and the additional low molecular weight surfactant comprises at least one member selected from the group consisting of cationic low molecular weight surfactants and nonionic low molecular weight surfactants.

21. The process as claimed in any one of claims 12, 14 and 15, wherein the additional high molecular weight surfactant comprises at least one member selected from the group consisting of anionic high molecular weight surfactants and nonionic high molecular weight surfactants, and the additional low molecular weight surfactant comprises at least one member selected from the group consisting of anionic low molecular weight surfactants and nonionic low molecular weight surfactants.

22. The process as claimed in any one of claims 12, 14 and 15, wherein the solid effective material is employed in an amount of 0.1 to 65% by weight based on the total weight of the emulsion.

23. The process as claimed in any one of claims 13 and 15, wherein the solid effective material and the additional solid effective material are used in a total amount of 0.1 to 65% by weight based on the total weight of the emulsion.

24. The process as claimed in any one of claims 12, 14 and 15, wherein the additional high molecular weight surfactant is employed in an amount of 0.5 to 20% by weight based on the total weight of the emulsion.

25. The process as claimed in any one of claims 12, 14 and 15, wherein the additional low molecular weight surfactant is employed in an amount of 0.5 to 20% by weight based on the total weight of the emulsion.

26. The process as claimed in claim 1, wherein in the mixing step (1), the oily substance in selected from the oily liquid materials, and next to the cooling step (4), a step of (4a) mixing a water-scant soluble particulate solid substance comprising at least one member selected from the group consisting of (i) solid effective materials which consist of solid cosmetic materials, solid dyes, solid pigments, solid food material, solid medicaments, solid agricultural chemicals, solid sanitary chemicals, solid home-use chemicals, solid office-use chemicals, solid construction and building materials, and solid industrial chemicals, and (ii) solid auxiliary additives which consist of solid viscosity modifiers, solid preservatives, solid mildewproofing agents, solid antifoaming agents and solid excipients, into the O/W type emulsion prepared in the step (4), is effected, and the resultant mixture of step (4a) is subjected to the stirring procedure of the step (5).

* * * * *